(No Model.)
E. N. DUNWIDDIE.
REEL CARRIER.
No. 526,692. Patented Oct. 2, 1894.
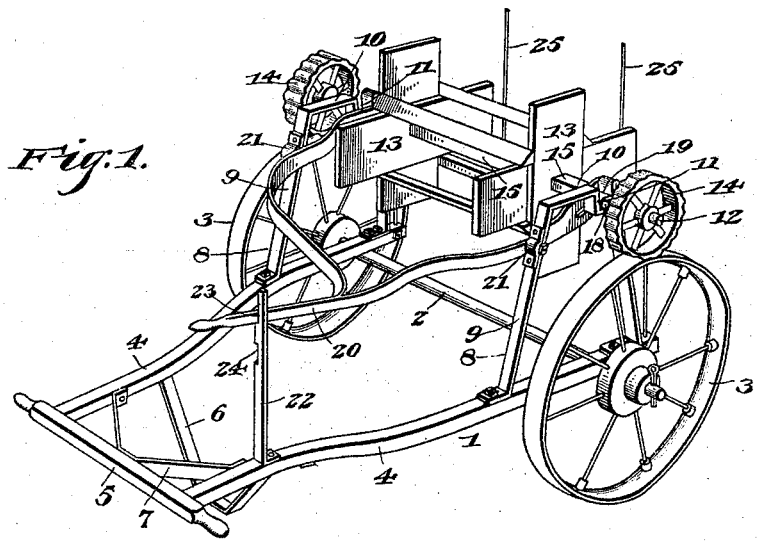
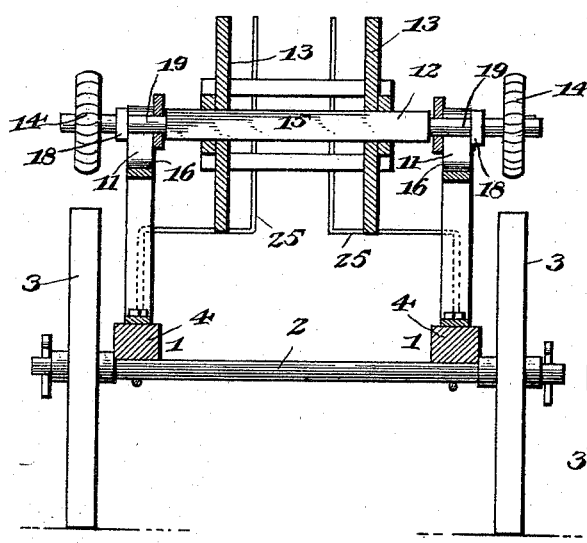
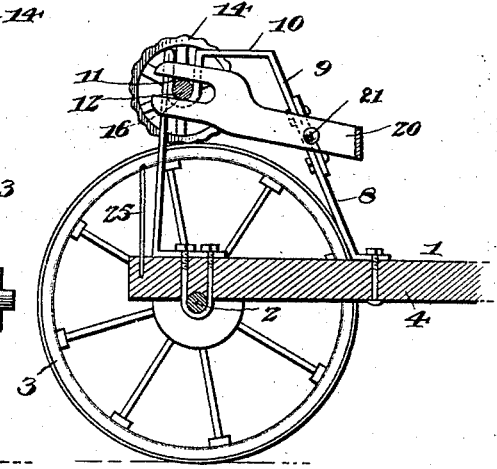
Witnesses
B. S. Ober
J. H. Riley
Inventor
Ezra N. Dunwiddie
By his Attorneys.
C. A. Snow & Co.

UNITED STATES PATENT OFFICE.

EZRA N. DUNWIDDIE, OF BRODHEAD, WISCONSIN.

REEL-CARRIER.

SPECIFICATION forming part of Letters Patent No. 526,692, dated October 2, 1894.

Application filed May 31, 1894. Serial No. 513,065. (No model.)

*To all whom it may concern:*

Be it known that I, EZRA N. DUNWIDDIE, a citizen of the United States, residing at Brodhead, in the county of Green and State of Wisconsin, have invented a new and useful Reel-Carrier, of which the following is a specification.

The invention relates to improvements in reel carriers.

The object of the present invention is to improve the construction of reel carriers, and to provide a simple and inexpensive one, which will enable barb or other wire to be readily unwound from a spool for fence building, or wound thereon when desired without the inconvenience of turning a crank.

A further object of the invention is to enable the spool which is to receive the wire, or from which the wire is to be unwound to be readily placed on and removed from the reel carrier.

The invention consists in the construction and novel combination and arrangement of parts hereinafter fully described, illustrated in the accompanying drawings, and pointed out in the claims hereto appended.

In the drawings—Figure 1 is a perspective view of a reel carrier constructed in accordance with this invention, Fig. 2 is a longitudinal sectional view of the rear portion of the reel carrier. Fig. 3 is a transverse sectional view.

Like numerals of reference indicate corresponding parts in all the figures of the drawings.

1 designates a horizontal supporting frame mounted at its rear end upon an axle 2 on the spindles of which are journaled carrying wheels 3; and the frame is composed of similar side bars 4 and a transverse handle bar 5 arranged at the front of the frame, and projecting laterally beyond the side bars thereof, and having such projecting portions shaped into handles. The front of the frame is provided slightly in rear of the handle bar with an approximately V-shaped support or lug 6, constructed of a single piece of metal doubled to form the opposite sides, and having its terminals bent horizontally and perforated to form securing plates. The frame is also strengthened at its front by a horizontal brace 7, constructed of a single piece of metal, approximately V-shaped, and having the terminals bolted or otherwise secured to the inner faces of the side bars of the frame, and similarly fastened at the bend to the center of the handle bar, at the inner face thereof.

The sides of the frame have mounted upon them, at their rear portions, metal bearing frames 8 composed each of oppositely inclined sides 9 and a top portion 10, which is approximately horizontal, and which is provided with a depending bend forming open bearings 11 for a shaft 12. The shaft 12 carries a spool 13, and it has fixed to its ends wheels 14 located slightly above the carrying wheels 3, and adapted to be lowered into contact with the said carrying wheels, whereby the shaft is caused to rotate with the latter for winding wire on a spool. The peripheries of the wheels 14 are preferably transversely corrugated or similarly roughened, in order to afford a somewhat positive contact with the carrying wheels, but at the same time to permit the shaft to slip to prevent any liability of breaking the wire.

The central portion of the shaft is squared at 15, to receive the spool, which may be readily removed from the shaft, by taking off one of the wheels 14, which are detachably keyed; and the ends of the shaft are rounded to form bearings 16, which are journaled in the bends of the bearing frames. Beyond the rounded portions 16 and separated therefrom by an intermediate squared portion 18 are rounded ends or journals 19, on which the wheels 14 are keyed.

The shaft is raised and lowered in the bearing bends by means of an operating frame or lever 20, constructed of metal, and consisting of a front straight portion or shank, and a rear forked portion, the sides of which are fulcrumed at 21 on the front inclined sides of the bearing frames. The terminals of the forked portion of the operating lever are bifurcated and receive the shaft, whereby, when the front portion of the operating lever is raised or lowered, the shaft will be moved down or up to carry the wheels thereof into contact with the ground wheels, or to raise them out of such contact, to allow the spool to revolve freely. The operating lever is secured in the desired position to cause the shaft to rotate with the carrying wheels, or to permit the same to revolve freely, by means of a vertical standard 22 provided with recesses 23 and 24. The upper recess 23 is adapted to hold the operating lever, the front end of which terminates in the handle, elevated to maintain the wheels 14 in frictional engagement with the carrying wheels; and the lower recess is for holding the wheels 14 elevated out of such engagement.

The carrier is adapted to be pushed over the ground by the operator when it is desired to re-spool wire, and as the carrier moves along the spool is rotated, and the wire is wound up on the same. In paying out wire the spool rotates freely, and the carrier is drawn along, and the wire rotates the spool, and is unwound as rapidly as the carrier is drawn forward. Wire is guided to the spool by guards 25 mounted on the rear ends of the sides of the frame, and consisting of rods rectangularly bent intermediate of their ends to offset inwardly their upper portions, which are disposed in rear of the spool in position to prevent the wire in being wound on a spool from leaving the same and getting beyond the sides thereof.

It will be seen that the spool carrier is simple and comparatively inexpensive in construction, that its operation is positive and reliable, and that it is capable of enabling wire to be readily unwound from a spool, or to be rewound thereon.

Changes in the form, proportion, and the minor details of construction may be resorted to without departing from the principle or sacrificing any of the advantages of this invention.

What I claim is—

1. In a reel carrier, the combination of a frame provided with carrying wheels, bearing frames mounted on the said frame at the sides thereof and provided at their tops with depending bends forming bearings, a spool shaft arranged in said bends and provided with wheels located above and adapted to engage frictionally with the carrying wheels, and a forked operating lever fulcrumed on the bearing frame and provided at its rear end with openings receiving the shaft, whereby the lever is adapted to raise and lower the shaft to carry the wheels thereof into and out of engagement with the carrying wheels, substantially as described.

2. In a reel carrier, the combination of a supporting frame provided with carrying wheels, bearing frames mounted on the supporting frame at opposite sides thereof and provided at their tops with depending bends, a shaft located in the bends and provided with wheels located above and arranged to engage frictionally the carrying wheels, a forked lever fulcrumed intermediate of its ends and having its rear terminals bifurcated and receiving the shaft, and a standard mounted on the supporting frame and provided with notches arranged to be engaged by the front portion of the lever, substantially as and for the purpose described.

3. In a reel carrier, the combination of a supporting frame provided with carrying wheels, the bearing frames mounted on the supporting frame at opposite sides thereof and provided at their tops with bearings, a shaft arranged in the bearings and provided with wheels located above and adapted to engage frictionally the carrying wheels, a forked lever fulcrumed on the bearing frames and connected at its rear terminals with the shaft, means for securing the lever at the desired adjustment, and the guide rods mounted on the frame in rear of the shaft and extending upward and having their upper portions inwardly offset and arranged to guide wire on a spool, substantially as described.

In testimony that I claim the foregoing as my own I have hereto affixed my signature in the presence of two witnesses.

EZRA N. DUNWIDDIE.

Witnesses:
L. A. WOODLE,
HETTIE LYNCH.